Patented Jan. 8, 1935

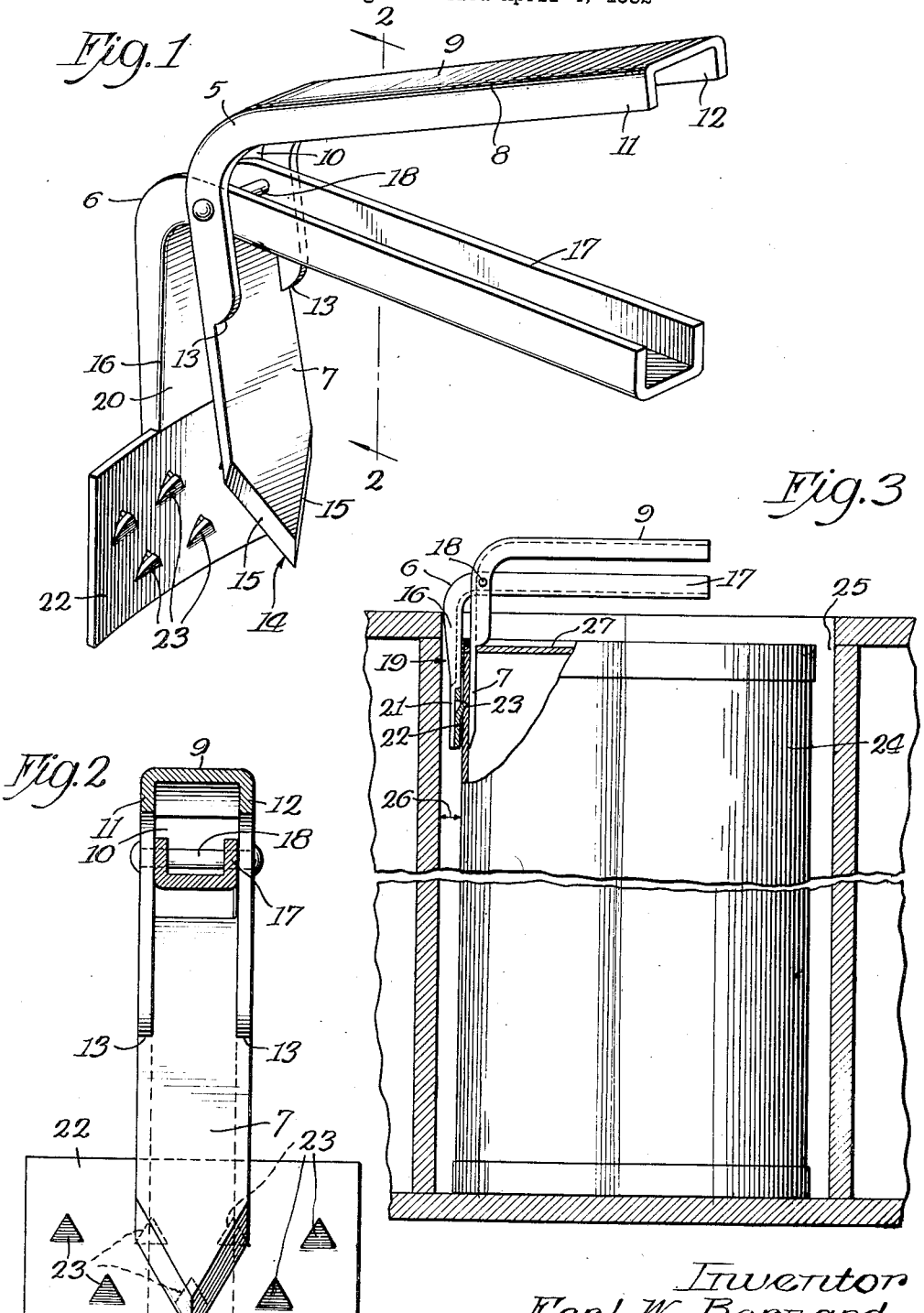

1,987,355

UNITED STATES PATENT OFFICE 1,987,355

ICE CREAM CAN LIFTER

Earl W. Barnard, Morris, Ill., assignor to Morris Paper Mills, Chicago, Ill., a corporation of Illinois Application April 4, 1932, Serial No. 603,137
Renewed May 31, 1933

5 Claims. (Cl. 294—28)

This invention relates to ice cream can lifters, and has particular reference to a lifter for handling paper or like disposable cans.

The main objects of the invention are to provide an improved lifter of the class described which will facilitate the insertion and removal of ice cream cans, both full and empty, from the conventional ice cream refrigerator compartment; to provide a lifter which will not be apt to objectionably injure the can as an incident to its gripping thereof; to provide such a lifter which will afford ample holding power on the can, together with a convenient handle arrangement whereby a full ice cream can may be expeditiously handled; and in general, it is the object of the invention to provide an improved lifter of the class described.

Other objects and advantages of the invention will be understood by reference to the following specification and accompanying drawing in which an ice cream can lifter embodying a preferred form of the invention is illustrated.

In the drawing:—

Fig. 1 is a perspective,

Fig. 2 is a section on a plane such as indicated by the line 2—2 on Fig. 1, and

Fig. 3 is a sectional view illustrating one of the functions of the lifter.

Referring now to the drawing, the lifter includes a pair of pivotally connected members 5 and 6 which are preferably formed from channel iron suitably galvanized or otherwise treated to prevent rusting thereof. The member 5 includes an inside jaw portion 7, and a handle portion 8 which extends laterally with respect to the jaw portion, the said jaw and handle portions being formed by bending the channel member 5 as clearly indicated in Fig. 1. The bottom wall 9 of the member 5 is apertured as indicated at 10 and the side flanges 11 and 12 of the member 5 are cut off as indicated at 13 intermediate the length of the jaw portion 7. The ends 13 of the side flanges 11 and 12 serve to limit the extent to which the jaw may be inserted into the ice cream can, as will presently appear. The end of the jaw 7 is pointed and sharpened as indicated at 14 to enable the jaw to penetrate the can cover and the contents of the can so as to permit the jaw to be positioned adjacent or against the inside of a portion of the can wall. The edges 15 of the pointed end portions of the jaw 7 are preferably beveled in the manner indicated so that when the jaw is inserted into a filled can of ice cream, the angle of the edges 15 tends to force the jaw outwardly towards the wall of the container.

The other member 6 is also preferably formed of a strip of channel iron or the like, and is bent to form a jaw portion 16 and a handle portion 17. The handle portion 17 is projected through the opening 10 in the jaw portion 7, and a pivot pin 18, extending through the respective flange portions of the handle and jaw, serves to pivotally connect the intersecting portions of the handle 17 and jaw 7. The flanges of the jaw element 16 are preferably tapered as indicated at 19 (see Fig. 3), and the bottom portion 20 of the jaw is offset outwardly as indicated at 21 to form a seat for a plate element 22. The plate element 22 is formed of suitable metal, and is preferably welded to the offset jaw portion 21.

The plate element 22 is provided with a series of upwardly projecting teeth 23 which are adapted to bite into the wall portion of the ice cream can.

In Fig. 3, a paper ice cream can is indicated at 24, the can being shown in a well or compartment 25 of an ice cream refrigerator, such as is used in most ice cream parlors. Such wells afford only a limited space such as indicated at 26 between the wall of the ice cream can and the wall of the well. Hence, it is important that the outside jaw 16 of the lifter be of such construction that its over-all thickness is maintained at a minimum consistent with the required strength. The desired channel iron construction appears to be entirely satisfactory in this respect for it combines strength with comparatively light weight and minimum size. As also shown in Fig. 3, the inner jaw member 7 penetrates the cover 27 of the container, the said cover also being made of paper, and the jaw is inserted into a position adjacent the inside wall of the container. It will be evident from an inspection of Fig. 3 that when the handles 9 and 17 are squeezed together, the inside and outside jaws 7 and 16 respectively will be also brought together to grip the can wall portion therebetween. The upwardly projecting teeth 23 effectively bite into the can body without penetrating or objectionably tearing the same.

By providing the comparatively wide gripping plate 22 with the series of spaced teeth as shown, the engaged portions of the can body are similarly spaced apart so as to avoid the tendency to weaken and tear the can.

As shown in Fig. 3, it is preferable that the arrangement be such that the handles 9 and 17 extend inwardly from the jaws so as to overlie the end of the container, this arrangement affording the best balance for facilitating lifting and carrying of the full ice cream can.

Changes in the described construction may be made without departing from the spirit of the invention, the scope of which should be determined by reference to the following claims, the same being construed as broadly as possible, consistent with the state of the art.

I claim as my invention:—

1. In a lifter of the class described, the combination of an inside jaw formed of a channel shaped member having a portion bent to extend laterally from the jaw portion to form a handle element, said member having an opening adjacent the junction of the jaw and handle portions, a second member having a jaw portion and a handle portion extending laterally from the jaw portion, said second member being also formed of a channel member and the handle portion thereof extending through said opening in the first mentioned member, means extending through the mutually overlapping side flange portions of said channel members for pivotally connecting said members, one of said jaw members being adapted to penetrate the cover and contents of the can and to be positioned adjacent the inside of a portion of the can wall, the other of said jaws being provided with means for biting into the wall portion opposite said inside jaw member when the handle members are squeezed together.

2. In a lifter of the class described, the combination of an inside jaw formed of a channel shaped member having a portion bent to extend laterally from the jaw portion to form a handle element, said member having an opening adjacent the junction of the jaw and handle portions, a second member having a jaw portion and a handle portion extending laterally from the jaw portion, said second member being also formed of a channel member and the handle portion thereof extending through said opening in the first mentioned member, means pivotally connecting the intersecting portions of said members, one of said jaw members being an inside jaw having its end sharpened so as to be adapted to penetrate the cover and contents of the can and to be positioned adjacent the inside of a portion of the can wall, the other of said jaws being provided with a gripping plate to provide an enlarged area of contact with the can wall, and said plate having a plurality of upwardly projecting teeth for biting into said can wall.

3. In a lifter of the class described, the combination of an inside jaw formed of a channel shaped member having a portion bent to extend laterally from the jaw portion to form a handle element, said member having an opening adjacent the junction of the jaw and handle portions, a second member having a jaw portion and a handle portion extending laterally from the jaw portion, said second member being also formed of a channel member and the handle portion thereof extending through said opening in the first mentioned member, means pivotally connecting the intersecting portions of said members, one of said jaw members being an inside jaw having its end sharpened so as to be adapted to penetrate the cover and contents of the can and to be positioned adjacent the inside of a portion of the can wall, the other of said jaws being provided with an outwardly offset end portion forming a recessed seat, and a gripper plate mounted on said other jaw in said recessed seat, said plate being transversely enlarged relative to the jaw portion on which it is mounted to thereby provide an enlarged area of contact with the can wall, and said plate having a plurality of relatively spaced, upwardly projecting teeth for biting into said wall.

4. In a lifter of the class described, the combination of an inside jaw formed of a channel shaped member having a portion bent to extend laterally from the jaw portion to form a handle element, said member having an opening adjacent the junction of the jaw and handle portions, a second member having a jaw portion and a handle portion extending laterally from the jaw portion, said second member being also formed of a channel member and the handle portion thereof extending through said opening in the first mentioned member, means pivotally connecting the intersecting portions of said members, one of said jaw members being an inside jaw having its end sharpened so as to be adapted to penetrate the cover and contents of the can and to be positioned adjacent the inside of a portion of the can wall, the other of said jaws being provided with an outwardly offset end portion forming a recessed seat, the thickness of said jaw member being tapered from normal, full thickness adjacent the upper end of the jaw to substantially the thickness of the material of the channel member from which the jaw is formed, and a gripper plate mounted on said other jaw in said recessed seat, said plate being transversely enlarged relative to the jaw portion on which it is mounted to thereby provide an enlarged area of contact with the can wall, and said plate having a plurality of relatively spaced, upwardly projecting teeth for biting into said wall.

5. A lifter for paper board ice cream cans, comprising a pair of L-shaped members pivotally connected adjacent the corners thereof and forming jaw handles and outer and inner jaws, said jaws being of comparatively thin but wide cross-sectional dimensions and having their wide faces in operative relation for engaging an upper marginal portion of the can wall, the outer jaw having a base portion opposed to said inner jaw and having inwardly projecting teeth on its inner face for biting into the can wall, and the inner jaw having a sharpened end adapted to pierce a paper board can cover and to penetrate the content of the can, said inner jaw having smooth, plain surfaces serving to resist adhesion of the content of the can into which said jaw may be inserted.

EARL W. BARNARD.